D. BOSWORTH.
Cooking Range.

No. 106,027. Patented Aug. 2, 1870.

Witnesses:
Fred. Haynes
R. E. Rabeau

Inventor:
Daniel Bosworth

N. PETERS, PHOTO-LITHOGRAPHER, WASHINGTON, D.C.

D. BOSWORTH.
Cooking Range.

No. 106,027. Patented Aug. 2, 1870.

Witnesses:
Fred. Haynes
R. V. Kabeau

Inventor:
Daniel Bosworth

United States Patent Office.

DANIEL BOSWORTH, OF NEW YORK, N. Y., ASSIGNOR TO JORDAN L. MOTT, OF SAME PLACE.

Letters Patent No. 106,027, dated August 2, 1870.

COOKING-RANGE.

The Schedule referred to in these Letters Patent and making part of the same

*To all whom it may concern:*

Be it known that I, DANIEL BOSWORTH, of the city, county, and State of New York, have invented a new and useful Improvement in Cooking-Ranges, of which the following is a full, clear, and exact description, reference being had to the accompanying drawing forming part of this specification, and in which—

Figure 1:
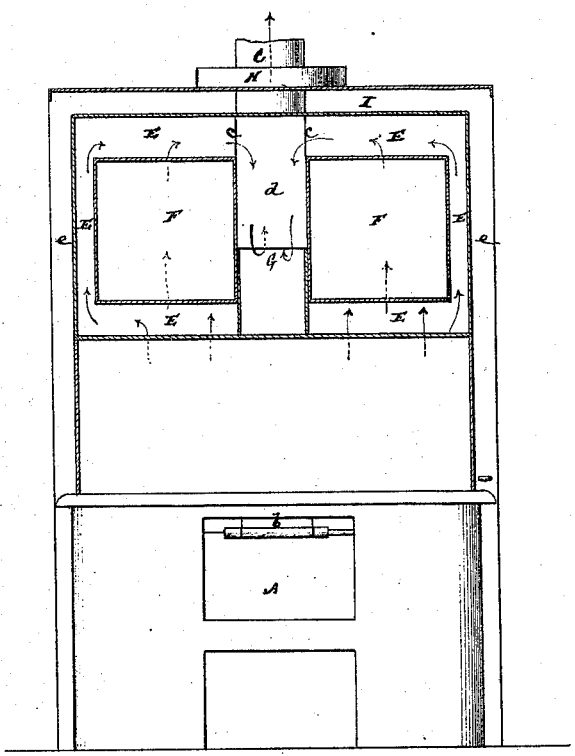
Figure 1 represents a front sectional elevation of a range constructed in accordance with my improvement, said section being taken as indicated by the irregular line $v\ v$ in Figure 2, which latter is a sectional elevation at right angles to fig. 1, being taken as indicated by the line $w\ w$ in Figure 4.
Figure 6:
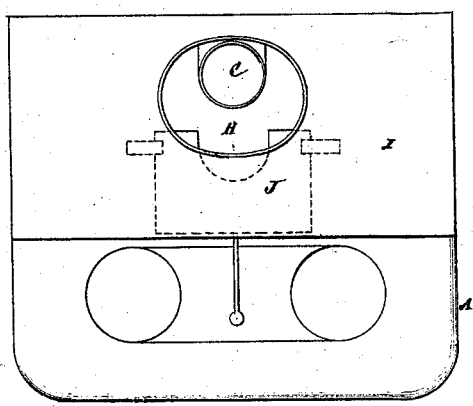
Figure 2:
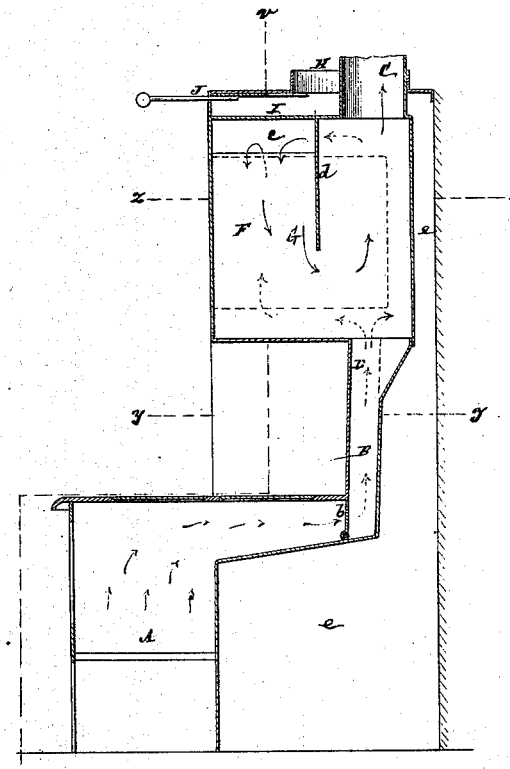
Figure 3:
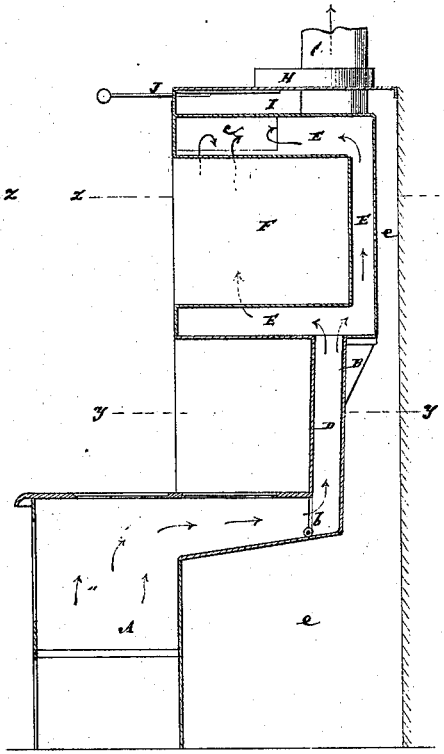
Figure 3 is a similar view, through the line $x\ x$ in fig. 4, which latter is a sectional plan through the line $y\ y$ in figs. 2 and 3.
Figure 4:
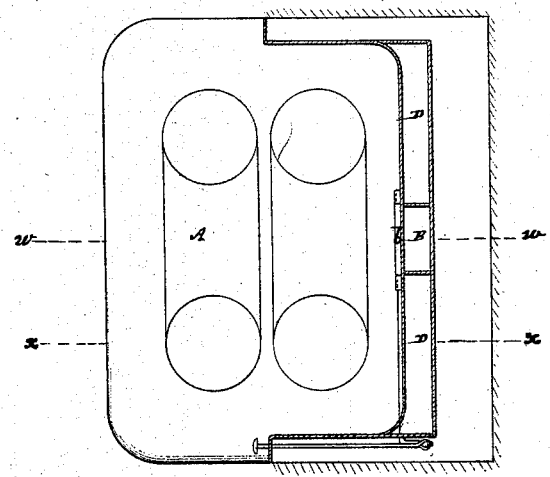
Figure 5:
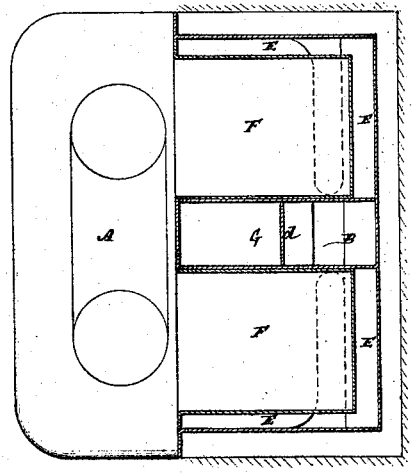
Figure 5 is also a sectional plan, through the line $z\ z$.

Figure 6, a plan of the whole range.

Similar letters of reference indicate corresponding parts.

My invention, which is not only applicable to cooking-ranges, but also to cooking-stoves, when the same are provided with an elevated oven or ovens, consists in a certain arrangement of a drop-flue between a pair of adjacent elevated ovens, in combination with flues from the fire-chamber, arranged to communicate with said drop-flue at its top, and an outlet-pipe or flue in connection with it from below. By this arrangement the heated products of combustion are restrained from too rapidly passing off in an upward direction, or checked as regards their flow past or around the ovens, which secures a more effectual heating of the latter.

The invention likewise includes a certain arrangement of an air-pipe surrounding the smoke-pipe and controlled by a damper, in combination with an air-casing arranged above the oven or ovens, the whole serving to effect and control the heating of a body or current of air passing from below to a chamber or place above.

Referring to the accompanying drawing—

A represents the fire-place or chamber of the range, the direct draught from which is controlled by a damper, $b$, in rear of the fire-place, so that, on opening said damper, the heated products of combustion may be passed off in a direct manner up a flue, B, in free or open communication with the smoke-pipe C, or, by closing said damper, said products of combustion be diverted from the fire-place to opposite sides of the flue B, and up through flues D D, which connect at their tops with a flue or flues, E, arranged to run under the bottom, over the back, outer side, and tops of elevated ovens F F, from whence the heated gases pass off, by openings $c\ c$, into a space between the ovens, and which has a partition plate, $d$, that makes of said space a drop-flue, G, in free communication below said partition with the smoke-pipe C.

By means of this drop-flue, in combination with the flues with which it connects, the circulation of the heated gases around the ovens is retarded, as it were, or the products of combustion prevented from passing off too rapidly in an upward direction, thus securing a more perfect heating of the ovens.

H is an air-pipe, arranged to surround, or partially so, the smoke-pipe C, and serving to convey heated air to a room or rooms above.

This air-pipe is made to connect with an air-casing, I, situated over the ovens, and in communication, at its rear and sides or ends, with air-supply flues or passages $e$, at back and sides of the range, between the latter and the brick-work in which it is set.

J is a damper, arranged to control the air-pipe H.

The air-casing I presents an extended surface over the ovens, for the heating of the air in its way to the pipe H.

What is here claimed, and desired to be secured by Letters Patent, is—

1. The arrangement of the drop-flue G between the elevated ovens F F, in combination with the flues E D and smoke-pipe or outlet C, substantially as specified.

2. The air-casing I and air-pipe H, provided with a damper, J, in combination with the smoke-pipe C, and arranged over the elevated oven or ovens F, essentially as shown and described.

DANIEL BOSWORTH.

Witnesses:
FRED. HAYNES,
R. E. RABEAU.